March 29, 1949.  B. W. CAMPBELL  2,465,790
MOUNTING FOR ENGINES FOR AIRCRAFT
Filed May 19, 1944  3 Sheets-Sheet 1

Inventor
Bruce W Campbell

March 29, 1949.　　　　B. W. CAMPBELL　　　　2,465,790
MOUNTING FOR ENGINES FOR AIRCRAFT
Filed May 19, 1944　　　　　　　　　　　　3 Sheets-Sheet 2
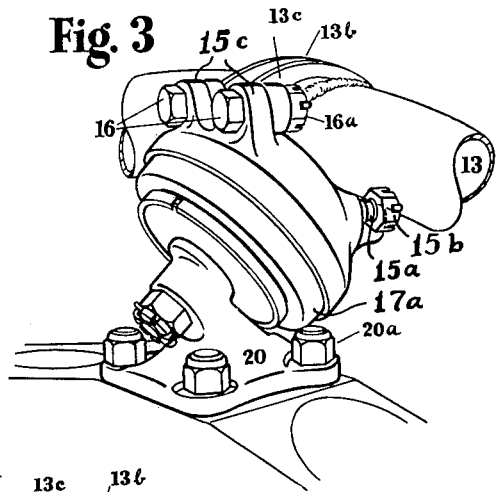
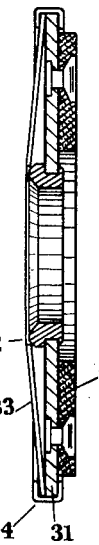
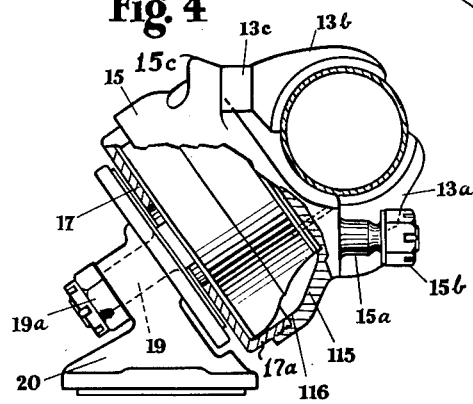
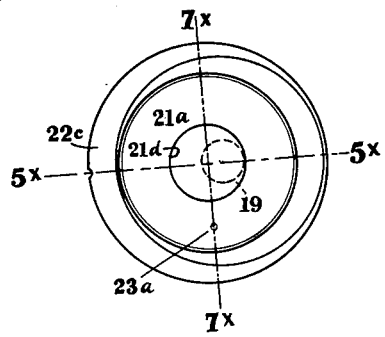
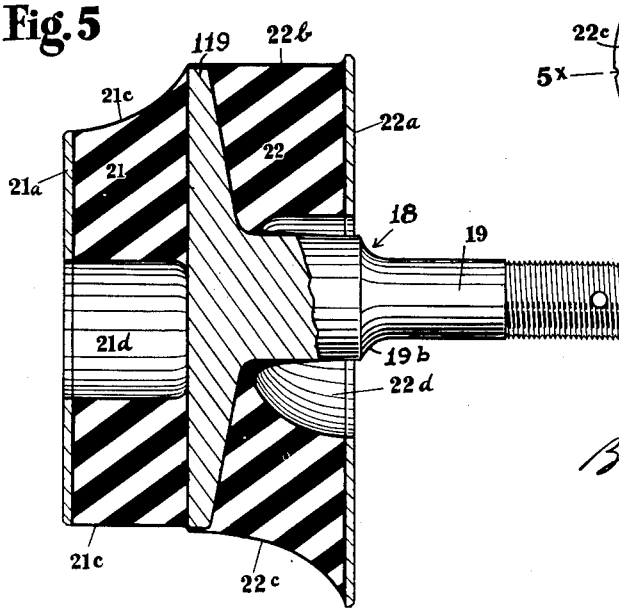
Inventor
Bruce W Campbell March 29, 1949.    B. W. CAMPBELL    2,465,790
MOUNTING FOR ENGINES FOR AIRCRAFT
Filed May 19, 1944    3 Sheets-Sheet 3

Inventor
Bruce W. Campbell

Patented Mar. 29, 1949

2,465,790

UNITED STATES PATENT OFFICE 2,465,790

MOUNTING FOR ENGINES FOR AIRCRAFT

Bruce W. Campbell, Erie, Pa., assignor to Lord Manufacturing Company, Erie, Pa., a corporation of Pennsylvania Application May 19, 1944, Serial No. 536,323

2 Claims. (Cl. 248—5)

1

My present invention relates to aircraft and particularly to the instrumentalities employed for connecting the power source or engine thereto in such a manner that the inherent vibrations created by the engine-propeller combination when operating at different speeds will be largely, or substantially absorbed, thus preventing such disturbances from being transmitted to the airplane or other type of apparatus or equipment on which said source of power is mounted.

One of the features of my invention is to provide a form of mount which will accommodate the longitudinal movement of the power source created by the thrust of the propeller at cruising speed.

My invention has for its further object to provide a mounting element, a series of which may be used to support the engine-propeller combination, which is of such construction that a conjoint action is effected with frictional braking devices provided for cooperation with some of them to assist in damping out the more pronounced movements in the rotational directions created by engine misfiring at low or idling speeds, with the mounting elements being so constructed that the braking devices are automatically rendered inoperative at the higher speeds of engine operation where such damping action is sometimes objectional.

A further object accomplished by my invention is the provision of an arrangement of the mounting housing, and the core or rubber element, which cooperate under high overload conditions encountered in maneuvers to effect a snubbing action to yieldingly check excessive movement of the power source.

To these and other ends my invention consists of further improvements all of which will be fully described in the following specification and more particularly pointed out in the appended claims.

In the drawings:

Figure 3 is a perspective view of one of the

2 mounts, showing its attachment both to the mounting ring and the engine including one of the braking elements.

Figure 4 is an enlarged cross sectional view illustrating in full lines the normal working position of one of the rubber elements of one of the mounts supporting the core under the load.

Figure 5 is an enlarged cross sectional view of a core element showing its eccentric construction taken on the line $5^x$—$5^x$ of Figure 6.

Fig. 6 is an end view of the core element.

Figure 7:
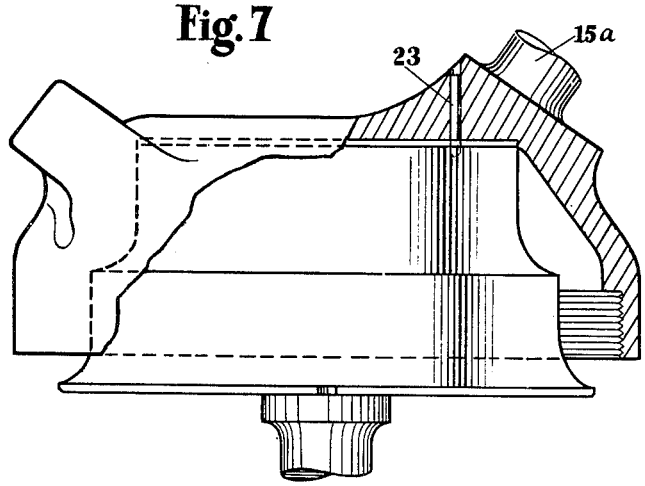

Figure 7 is a view of a core element within its housing, which is partly in section, showing the core before it is compressed and secured therein, the core being illustrated in elevation as viewed in a plane represented by the section line $7^x$—$7^x$ of Figure 6.

Figure 8:
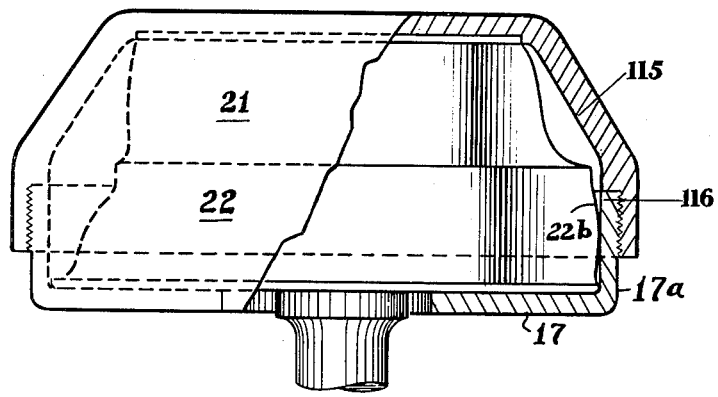

Figure 8 is a view similar to Figure 7, but showing the elastic portions of the core compressed and secured within the housing, portions of the latter being broken away, the section being taken as viewed in a plane represented by the line $5^x$—$5^x$ of Figure 6.

Figure 9 is a cross sectional view showing the structure of the braking device employed in service on the two lateral mounts of the series.

Similar reference characters in the several figures indicate the same parts.

Figure 1:
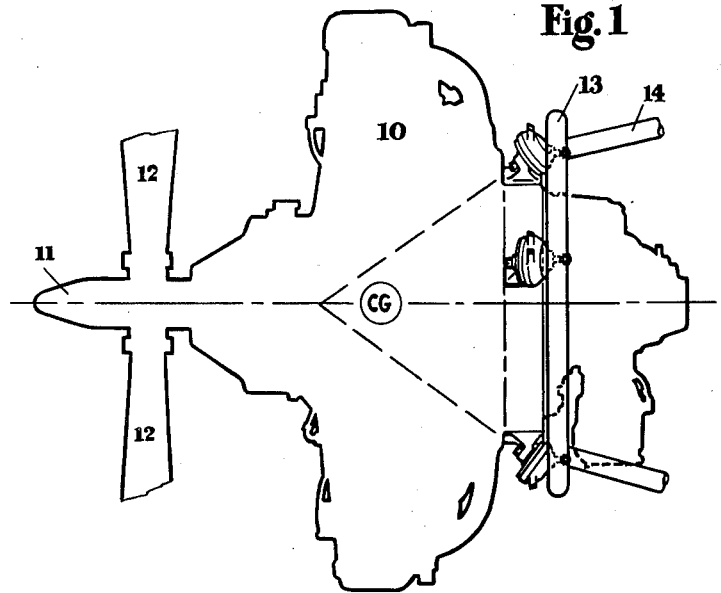
Figure 1 is a side-view showing the mounting ring of an aircraft, the engine-propeller unit, and the position of three of the series of engine mounts.

In Figure 1, I have shown in outline an airplane engine, indicated by 10, the driving shaft of which carries at its forward end the hub 11 on which propeller blades 12 are attached. The rear end of the engine extends through a mounting ring 13 which is supported by rearwardly extending struts 14 attached to the fire wall or other portion, of the airplane, as will be understood.

The power plant or engine 10 is supported in an overhanging position from the ring 13 by a series of vibration absorption mountings so designed that, in addition to carrying the load, the effect of vibrations created by the operation of the engine-propeller combination will be focused about a point in the vicinity of the center of gravity of the supported load. The center of gravity is indicated by cg in Figure 1 and the focal point of the several mounts is shown by the converging broken lines.

In general, the arrangement of the mounts is such that during the operation of the power plant, a decoupling of the vibratory forces created is effected, giving thereto the six degrees of freedom of movement as taught in the reissue patent to W. E. Stitz, No. 21,328, dated January 16, 1940.

To accomplish the above and to carry the weight of the power plant the mounts are disposed in pairs located between the engine 10, and the ring 13, there being one pair, *a* and *b* located at the top portion of the ring; another pair *c* and *d* located at the bottom thereof, and two side mounts *e* and *f*. These several mounts are alike in construction a detail description of one will suffice for all, with the exception of the side mounts *e* and *f* which are provided with a braking element that will be further described hereinafter.

Figure 2:
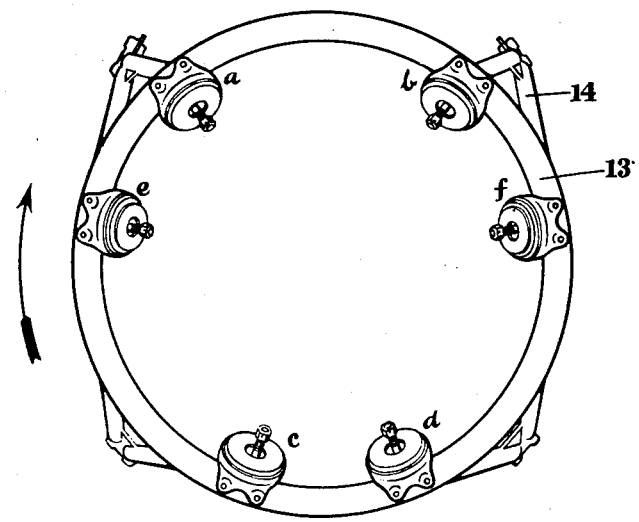
Figure 2 is a view looking rearwardly from a plane in front of the mounting ring showing the space arrangement of a series of the mounts thereon.

Mountings embodying my invention in addition to their being designed to control vibrations created in the power plant, for the purpose of substantially preventing their transmission to the airplane structure, perform the duty of supporting the dead weight of the power plant, accommodate the torque created when the engine is in operation and permit the thrust movement thereof which heretofore has been the cause of certain vibratory disturbances which it has been difficult, if not impossible, to control. For the accomplishment of these characteristics the mounts are disposed between the engine and the mounting ring as shown in Figures 1 and 2, and each comprises a housing 15 suitably connected to inner and outer sets of lugs 13$^a$—13$^b$ on the ring 13. The inner lugs receive the threaded prong 15$^a$ secured by the nut 15$^b$. The outer lugs 13$^b$ have laterially extending ears 13$^c$ registering with ears 15$^c$, which are on casing 15, secured by the cap bolts and nuts 16—16$^a$. The housing also comprises a flat cover plate 17 having an annular edge 17$^a$ which extends into the rim of the housing, these parts being secured together by a screw thread connection as shown in Figures 4 and 8. This cover serves to secure the inner portion or core of the mounting, generally indicated in Figure 5 by 18, having a stem 19 which projects through a central aperture in the cover plate. In assembling the parts the stem 19 is secured by a nut 19$^a$ to the angularly disposed portion of an engine bracket 20 which is attached to a seat on the engine casing by studs 20$^a$, as shown in Figure 2.

The hollow interior of the casing or housing 15 is frusto-conical, as indicated at 115, its edge gently rounding into a cylindrical surface 116, which continues along the inner surface of the annular rim of the cover, said surfaces being thus formed for cooperation with the rubber or elastic elements of the core as will be set forth later.

In the construction of the core the stem 19 is provided with a head 119, on the opposite sides of which are bonded by a vulcanization process elastic members, of rubber or synthetic rubber compositions, indicated by 21 and 22. The former is secured to the top face of the core head 119, and the latter to the underside thereof. On the outer face of the element 21, is a plate 21$^a$, and on the corresponding face of element 22, is a plate 22$^a$, said plates being of such diameters that the one first mentioned seats in a recess at the bottom of the housing and the other fits against the inner side of the cover. Since these plates are likewise bonded to the respective rubbers and with the parts in operative position nest snugly against the opposing surfaces of the interior of the housing 15, the effect achieved is the same as if said inner and outer faces of the rubber sections were in reality bonded to the opposing faces of the housing.

In order to carry the static load of the power plant, and at the same time make provision to care for the impressed torque load, the core stem is offset or disposed eccentrically with relation to the housing axis and the central apertures in the cover 17, and plate 22$^a$ are made sufficiently large to allow an unrestricted lateral movement of the core within the bounds of the spring rates provided by the designed characteristics of the rubber elements. It will be seen from Figures 4, 7, and 8 that diameter of the core head 119, is sufficiently less than the interior circular part of the housing so that although it is offset in the housing that some distance still remains between the surface 116, and the nearest portion of the edge of the head so that said core is free to move in all directions. The position just described is that of the metal parts of the core before the weight of the power plant is applied. Under normal cruising conditions the eccentricity of the cores is substantially neutralized by the yielding of the elastic elements so that the core stems 19, for all practical purposes coincide with axes of their respective housings.

The design of the rubbers 21 and 22 are, in engineering parlance, soft, giving due weight to the engineering characteristics embodied in them so that in addition to carrying the imposed load their so called spring rates care for the natural and imposed frequencies of vibration created by the power plant at various speeds of rotation such as occur during idling, take off, cruising and maneuvering of an airplane.

To accomplish in operation the ultimate desired effects the metallic portion of the core is eccentrically disposed, as previously mentioned, with respect to the plate 22$^a$, and the elastic block 22, which is likewise circular, is also eccentric thereto and of a size equal to or preferably slightly in excess of the diameter of the core disc 119 in order to provide its edge with a sheath which may on occasion prevent it contacting directly with the inner surface 116, of the housing as well as forming a rim connecting the rubber 22, with the rubber 21. This positioning of the rubber 22 in its relieved state provides a straight wall 22$^b$ on one side, and at the opposite side, a wall which is curved outwardly at its edge, as indicated by 22$^c$.

The rubber 21, is somewhat smaller than the core disc 119, and is secured thereon in an eccentric position, offsetting the eccentricity of the rubber 22, so as to provide it with a straight wall 21$^b$ at the side where it is nearest in line with the edge of the disc from which point as the wall progresses around this rubber, it flares outwardly at the bottom as shown at 21$^c$ (see Figures 5 and 6). The center of this rubber may be provided with a recess 21$^d$ which may be varied in depth and diameter to aid in giving rubber its desired characteristics.

The rubber 22 is likewise provided with a central recess 22$^d$, the primary purpose of which is to afford freedom of movement of the core stem 19.

A centering pin 23 is placed in the housing at the base of the stud 15$^a$, where the wall of the housing has substantial thickness and its inner end projects within the housing, and engages an aperture 23$^a$ in the core plate 21$^a$. This centering arrangement is provided so that in the initial assembling of the parts (and in the subsequent replacement of cores) the eccentricity of all of the cores in their respective housings will be the same. The pin is a snug fit in the drill hole in which it is placed so that should its inner end be sheared off, or should it be pushed out in the event the plate 21ᵃ is caused to ride over it, it may be forced into proper position by the use of a suitable instrument.

In assembling the core in the housing the parts are brought into register as shown in Figure 7, and by the application of pressure the elastic element 21 is compressed sufficiently to permit the cover 17 to be screwed into seated position on the housing 15, as shown with greater particularity in Figures 4 and 8. Both of the rubbers are therefore in a state of compression and until a load is applied, their circumferential walls are bulged, or somewhat distorted, as shown in Figure 8. In this position that portion 22ᵇ of the wall lying closest to the housing wall 116 will lie closely thereto. It may even be in contact therewith as the purpose is to so arrange parts in an offset position when unloaded that when they carry the weight of the power plant the rubbers will assume a predetermined position more or less as indicated by dotted lines in Figure 8, to enable the core as a whole to occupy a substantially central position in its housing.

It is from this last mentioned position that the rubber, or elastic, elements perform their function in reacting to the torque impulses, and provide the necessary movements of the power plant to enable them to absorb the various types of vibration created at different R. P. M. of the engine crank shaft and propeller. The elastic elements being soft, so called, as distinguished from those which are rendered less resilient, by being made either of stiffer compounds, or stiffened by the inclusion of one or more plates imbedded therein enables me to benefit from the initial bulging of the rubber walls as it will be seen that I have provided means whereby any excessive movements will be checked by a snubbing action which occurs when the bulging walls engage with either the interior conical surface 115 of the housing or with its cylindrical surface 116.

It will be observed that the mass of the bottom rubber 22 is in excess of that of the upper rubber 21. Its composition and size is such that when the power plant is operating at cruising speed these elements of the series of mountings not only carry the weight thereof largely by compression, but that such several elements will permit, or accommodate, the forward axial thrust imparted to the mass by the propeller, a circumstance which I have determined in practice contributes greatly to the smoothness of operation of the power plant.

Airplane engines have inherent characteristics which make it desirable to provide additional means for checking the torque movement developed at low operating speeds, for instance, when idling, which if not relieved at higher operating engine speeds serves to transmit high frequency vibrations to the supporting structure. This action may be checked, when necessary, by the use of a mechanical braking device applied to the two lateral mountings e and f (Figure 2). This structure is illustrated in Figure 9, and comprises a flat brake shoe 30, riveted to a plate 31, carried on a collar 32. On the outer side of plate 31 a dish shaped spring 33, is secured by a circumferential channel strip 34. In assembling the parts the collar 32 fits against a shoulder 19b of the core stem 19, the brake lining engages the flat face of the housing cover 17, and the center of the spring 33 resting against the rim of bracket 20, is put under compression by screwing up the nut 19a on the pedestal stem. The relief afforded by the compression of the rubbers 22, as above set forth, is sufficient at higher engine speeds to permit the compression of the brake spring to be entirely relieved whereby at cruising speed the entire power plant virtually floats on the elastic supports.

In carrying out my invention it will be recognized that because of the impossibility of obtaining perfect dynamic balance of the moving parts of an airplane engine-propeller combination coupled with the necessity of supporting and sustaining it with reasonable stability while at the same time providing those degrees of independent movement which largely eliminates the transmission of vibration to the airplane structure I have, by devising a so-called radially "soft" mounting, accomplished a hithertofore unknown advantage by providing a freedom of movement which accommodates the imparted longitudinal thrust. Heretofore the standard practice has been to make engine mountings with the elastic elements comparatively stiff radially. A significant difference between the latter and my present structure can be illustrated by reference to the "L" values of the equations used in determining the provisions required in caring for the natural frequencies of vibration developed by the system as set forth on page 3 of Patent 2,175,999. Therein, L equals the ratio of the compression stiffness of the elastic element to the shear stiffness. Heretofore the standard practice has dictated the use of "L" values of from 20 to 45 or higher. The use of the "high L" value has made the natural frequency, or resonant point, of the fore and aft mode of vibration lie in the operating range of the engine and when any excitation is present in this mode produces excessive disturbance in the supporting structure at this resonant point. By the use of a softer elastic medium with an "L" value of 10 to 15 and providing a snubbing effect to limit excessive movement and maintain stability it has been made possible to lower this fore and aft natural frequency below the operating range where resonant conditions are not harmful.

What I claim as new is:

1. In an engine mounting, the combination with a hollow casing having partly cylindrical and partly frustoconical side walls and parallel top and bottom walls, of an intermediately located and eccentrically disposed core head within the housing having a stem extending exteriorly thereof, resilient elements disposed between the opposite sides of the core head and the top and bottom walls of the housing, said elements being disposed eccentrically with relation to each other and of sufficient thickness and diameter to provide side walls on the core which bulge laterally upon compression of said elements into the housing and are capable of further movement laterally under displacement of the core to engage with the cylindrical and conical walls of the housing.

2. A shear sandwich type mounting for an aircraft engine having supporting and supported members for connection respectively to the engine and its supporting structure, said members having opposing surfaces between which is sandwiched an element of resilient material such as rubber bonded to the surfaces, and said members being arranged to stress the rubber in shear in response to engine vibrations and in direct stress in response to propeller thrust whereby the supporting and supported members move relative to each other and assume relative position corresponding to the propeller thrust, a damper comprising friction surfaces carried respectively by the supporting and supported members and sliding relative to each other in response to the shear distortion to produce friction damping, and spring means having a limited travel urging the friction surfaces together, the limit of travel of the spring means being less than the relative movement of the supported and supporting members accompanying propellor thrusts above a predetermined magnitude whereby the friction surfaces can no longer be held in contact so long as the propellor thrusts exceed said predetermined magnitude.

BRUCE W. CAMPBELL.

REFERENCES CITED

The following references are of record in the file of this patent:

UNITED STATES PATENTS

| Number | Name | Date |
|---|---|---|
| 2,115,458 | Geyer | Apr. 26, 1938 |
| 2,241,408 | Lord | May 13, 1941 |
| 2,271,016 | Julien | Jan. 27, 1942 |
| 2,317,190 | Henshaw | Apr. 20, 1943 |
| 2,317,500 | Tyler | Apr. 27, 1943 |
| 2,317,501 | Tyler | Apr. 27, 1943 |